Sept. 16, 1930.   L. A. TAYLOR ET AL   1,775,740
PROCESS AND APPARATUS FOR THE RECOVERY OF FISH PRODUCTS
Filed April 23, 1926
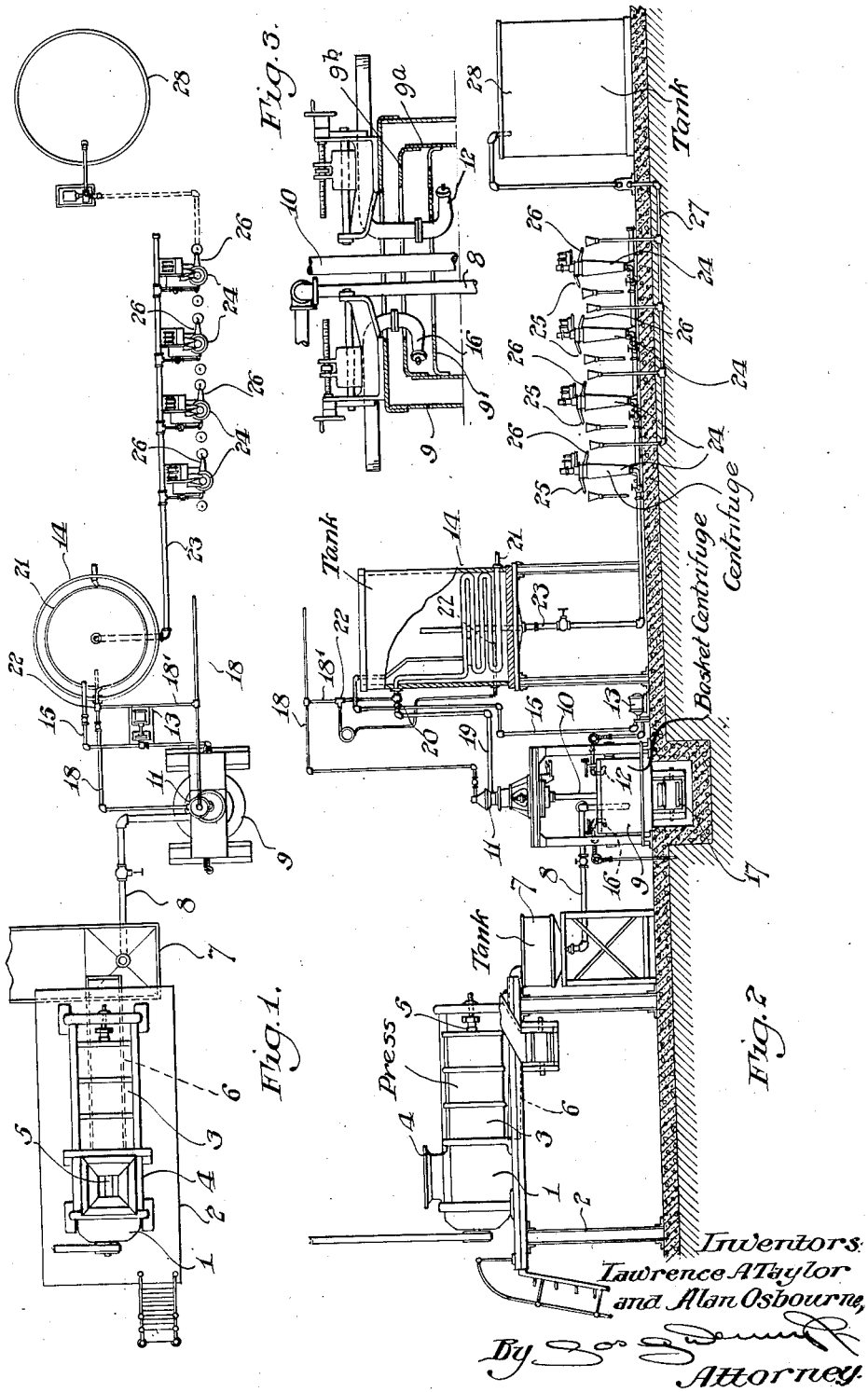
Inventors
Lawrence A Taylor
and Alan Osbourne,
By
Attorney Patented Sept. 16, 1930

1,775,740

UNITED STATES PATENT OFFICE

LAWRENCE A. TAYLOR AND ALAN OSBOURNE, OF SAN FRANCISCO, CALIFORNIA, ASSIGNORS TO SHARPLES SPECIALTY COMPANY, OF PHILADELPHIA, PENNSYLVANIA, A CORPORATION OF DELAWARE

PROCESS AND APPARATUS FOR THE RECOVERY OF FISH PRODUCTS

Application filed April 23, 1926. Serial No. 104,139.

This invention is an improved process and apparatus for the recovery of increased yields of a superior quality of oil and meal or cake from fish with a minimum of the offensive odors and by-products heretofore incident to the industry.

The expression of liquid constituents from fish, scrap or offal by pressure results in the dissemination through the expressed oil and water of finely divided mushy particles of solids commonly known as "gurry", which cannot be removed on a commercial scale by filtration because of its sticky, gluey nature, and which commonly amounts to from four to twelve per cent of the raw material fed to the press. The gurry is so intimately mixed with the liquids that long periods of heating and settling have heretofore been required to effect any substantial separation of the liquid from the gurry, and the oil decanted after an initial gravity settling is by no means free from water or solids and must be subjected to further gravity settling and washing with warm water in a series of tanks. The solids while settling decompose and putrefy with resulting deterioration of the quality of the oil and impairment or loss of the solids. The settling solids also enmesh and carry down considerable amounts of oil, and form with the water a malodorous waste, the disposal of which presents serious problems and involves the loss of a valuable part of the fish meal. The adhesion of oil to, or its enmeshment with, solids buoys up the latter and tends to prevent subsidence of the solids through the water and to maintain them at or near the liquid interface. The secondary purification of the oil results in a marked increase in free fatty acids and a further loss of oil in washing.

In accordance with the present invention, the total fresh effluent from the press is continuously centrifuged and all values are recovered; the freshly expressed extract being promptly centrifugally stratified into distinct concentric layers of oil, water and fish meal substantially free of oil. The centrifugal force strips from the particles of solids the oil enmeshed therewith or adhering thereto, thereby permitting the particles to pass readily through the water and form a peripheral cake. The cake when discharged from the bowl may be dried, and either used separately or combined with the cake from the press.

The water layer may be drawn off through a suitably adjusted skimming nozzle and being substantially free from either fish solids or oil may be discharged directly to the sewer without further treatment.

The oil discharged from the centrifuge, preferably by means of a skimming nozzle, is further subject to high centrifugal force for the removal of any cloudiness, and for certain species of fish or fish growing under certain conditions it may be necessary or desirable that the second centrifuging take place after a period of rest and heating the oil. The standing is non-injurious, because the oil has been freed from easily decomposable matter, and facilitates the centrifugal removal of the suspensions of moisture and fine albuminous matter present. The secondary centrifuging produces a clear oil of low free fatty acid content.

In the accompanying drawings, Fig. 1 is a diagrammatic plan view of apparatus suitable for the practice of the process; Fig. 2 is a side elevation thereof; and Fig. 3 is a fragmentary sectional view of a suitable type of primary or basket centrifuge.

As illustrated in the drawings, a power driven steam heated press 1 is supported in an elevated position by the frame 2 and comprises a perforated, horizontal truncated conical body 3 having an inlet hopper 4 and containing a rotatable screw 5. The rotation of the screw carries forward and subjects to pressure the steamed or cooked fish, scrap or offal fed into the hopper; and the liquid and suspended fish particles expressed therefrom are collected by the casing 6 and discharged into the centrifuge supply tank 7. The bulk of the solids are discharged from the front of the press to a suitable chute, not shown.

The liquid and solids mingled therewith flow from the tank through the valve controlled pipe 8 to a centrifuge 9, having a basket or rotor 9ª with an open top and bottom and a large diameter relatively to its length, the basket being suspended from the spindle 10 driven by a steam turbine 11, and the imperforate side wall of rotor 9ª having an inturned flange, such as flange 9ᵇ, at its top and bottom to maintain the material in the rotor during the separation thereof.

The rotation of the basket, which has an imperforate wall, immediately separates the oil, water and solids into three distinct subdivisions or strata. Oil is skimmed from the inner stratum in the bowl by an adjustable nozzle 12 contacting with the inner surface of the oil layer and connected with a pump by which the skimmed off oil is pumped to the top of the elevated tank 14 through the pipe 15.

An adjustable nozzle 16 is positioned in the bowl 9ª, above the ring or dividing wall 9′ to withdraw, from the intermediate stratum, water which may be discharged to the sewer without further treatment.

The meal or cake is thrown outwardly by centrifugal force and accumulates around the periphery of the bowl 9ª and may be discharged from the bottom thereof to the conveyor 17, either intermittently or by means of a shovel or scraper.

The turbine 11 is supplied with live steam from the live steam line 18 and the exhaust therefrom is discharged through the pipe 19 containing the one way valve 20 to the heating coil 21 in the tank 14. The heat supplied by the exhaust steam may be supplemented from the live steam line through the branch 18′ controlled by the temperature regulator 22 having its terminus in the bottom of the tank.

The tank 14 is preferably of such size as to hold at least six hours' oil output of the centrifuge 9 and is preferably maintained at such temperature that the oil discharged through the valve controlled outlet pipe 23 has a temperature of approximately 200 degrees F.

The pipe 23 supplies heated oil to the bottom of a battery of centrifuges 24, preferably of the Sharples type, having tubular bowls with imperforate walls and of small diameter relatively to their length. These centrifuges are operated at high R. P. M. and effect the separation from the oil of moisture and suspensions therein, which are discharged through the spouts 25 to waste while the purified oil is discharged through the spouts 26 to the line 27, from which the oil is pumped into the storage tank 28.

By the process and apparatus described, practically all the oil expressed from the fish is recovered without deterioration or contamination and the discrete solids of high nitrogen content wasted in prior processes are recovered substantially freed from oil and in condition for treatment in the drying ovens. The heating and settling of the oil for approximately six hours after separation from the water and solids greatly facilitates purification thereof by the final centrifugal operation without material increase in the fatty acid content or loss of oil. The delay in feeding the oil to the second centrifuge affords a rest period permitting coalescence of moisture and solid suspensions into particles centrifugally separable from the liquid.

Under certain conditions, it may be desirable to so operate the primary centrifuge 9 as to merely effect separation from the liquids of substantially all the sensible solids, before decomposition of such solids occurs, and to effect separation of the liquids from one another in the secondary centrifuges 24.

Having described our invention, we claim:

1. In the process of recovering fish oil from oil bearing fish, the steps which comprise separating the fish by pressure into several portions, one portion containing the bulk of the solids and the other portion containing the bulk of the aqueous and oily constituents of the fish with undecayed fish solids mingled therewith, centrifugally stratifying the second named portion into layers of substantially undecayed solids, water and oil, skimming off the water and oil and discharging the solids, heating the separated oil and water mixed therewith, and centrifuging the oil and water mixed therewith.

2. In the process of recovering fish oil from oil bearing fish extract the steps which comprise centrifugally separating oil from solids, and centrifuging separated oil after effecting coalescence of suspensions into particles centrifugally separable from the oil.

3. Apparatus for the recovery of fish oil from oil bearing fish extract which comprises means for extracting fluid from fish, a basket centrifuge having an imperforate wall to which said means discharges, skimming means for removing fluid from said centrifuge, a heater for the skimmed fluid, and a centrifuge to which said heater discharges.

4. In a process for the recovery of fish oil from oil-bearing fish, the steps which comprise separating the fish by pressure into several portions, one portion containing the bulk of the solids and the other portion containing the bulk of the aqueous and oily constituents of the fish with fish solids mingled therewith, centrifugally stratifying the second named portion into a radially outermost layer of fish solids, an intermediate layer of water, and an inner layer of oil, skimming off the oil separately from said inner layer, heating oil so skimmed off and any water skimmed off therewith, and centrifugally removing water and solids from the heated oil.

5. In the process of recovering fish oil from oil-bearing fish extract containing water, oil and solids, the steps which comprise centrifugally stratifying said extract into a radially outermost layer of solids, an intermediate layer of water, and an inner layer of oil, skimming off oil separately from said inner layer, heating the oil so skimmed off and any water skimmed off therewith, and centrifugally removing water and solids from the heated oil.

6. In the process of recovering fish oil from oil-bearing fish extract containing water, oil and solids, the steps which comprise subjecting the extract to centrifugal force and thereby stripping the oil from the solids and causing the solids to be wetted by the water, skimming oil from the inner surface of the material that is under the influence of centrifugal force, heating the oil that is so skimmed from said inner surface and any water skimmed off therewith, and centrifugally removing water and solids from the heated oil.

7. In the process of recovering fish oil from oil-bearing fish extract containing water, oil and solids, the steps which comprise centrifugally stratifying said extract into a radially outermost layer of solids, an intermediate layer of water, and an inner layer of oil, skimming from the inner surface of the material that is under the influence of centrifugal force, oil contaminated with water and particles of solids, subjecting to a second centrifugal treatment while in a heated state the liquid so skimmed from the inner surface of the mixture treated in the first centrifugal operation and thereby removing water and solids from the heated oil.

In testimony whereof we have hereunto set our hands this 8th day of April, 1926.

LAWRENCE A. TAYLOR.
ALAN OSBOURNE.